United States Patent [19]

Ichihashi et al.

[11] Patent Number: 4,748,459

[45] Date of Patent: May 31, 1988

[54] INK JET RECORDING APPARATUS AND CAPPING DEVICE

[75] Inventors: Hiroo Ichihashi, Hiratsuka; Masakazu Ozawa, Ebina; Ryuichi Ebinuma, Hiratsuka; Atsushi Saito, Yokohama, all of Japan

[73] Assignee: Canon Kabushiki Kaisha, Tokyo, Japan

[21] Appl. No.: 887,722

[22] Filed: Jul. 21, 1986

[30] Foreign Application Priority Data

| | | | |
|---|---|---|---|
| Jul. 25, 1985 | [JP] | Japan | 60-163017 |
| Jul. 25, 1985 | [JP] | Japan | 60-163018 |
| Jul. 26, 1985 | [JP] | Japan | 60-164030 |
| Jul. 29, 1985 | [JP] | Japan | 60-165815 |

[51] Int. Cl.[4] .......... G01D 15/16

[52] U.S. Cl. .......... 346/140 R; 137/571; 141/31

[58] Field of Search .......... 346/140, 75; 137/247, 137/395, 396, 453, 571; 141/198, 31

[56] References Cited

U.S. PATENT DOCUMENTS

| | | | |
|---|---|---|---|
| 3,386,102 | 5/1968 | Scheuzger | 346/140 |
| 4,278,360 | 7/1981 | Lorscheid | 141/31 X |
| 4,577,203 | 3/1986 | Kawamura | 346/140 |

*Primary Examiner*—Joseph W. Hartary
*Attorney, Agent, or Firm*—Fitzpatrick, Cella, Harper & Scinto

[57] ABSTRACT

A capping device for an ink jet recorder is provided with a support frame of substantially L-shaped cross-section contained in a frame and supporting an ink absorbing member inside thereof, and a throttle plate in contact with the underside of the absorbing member and disposed substantially parallel to the support frame, the capping device being so disposed that the rear end edge of the throttle plate opposite to a recording head is situated vertically below the side edge surface of the recording head. The specification also discloses an ink jet recording apparatus having such capping device. (FIGS. 1 and 6–8). A flow path for directing liquid squeezed from the absorbing member has upper and lower stages, the upper stage having a sufficiently large diameter that a liquid meniscus does not form and the lower stage having a small diameter that permits a meniscus to form. (FIGS. 9 and 10).

14 Claims, 8 Drawing Sheets

INK JET RECORDING APPARATUS AND CAPPING DEVICE

BACKGROUND OF THE INVENTION

1. Field of the Invention

This invention relates to an ink jet recording apparatus and a capping device, and more particularly to an ink jet recording apparatus in which a capping device is urged against the nozzle portion of an ink jet printer to accomplish the ink non-discharge recovery operation and to a capping device in such apparatus.

2. Related Background Art

In an ink jet printer flying liquid droplets are discharged from an orifice at the end of a nozzle toward recording paper by various means to thereby accomplish dot recording.

In the ink jet printer of this type, the use of liquid ink causes occurrence of a non-discharge phenomenon such as the non-discharge of ink resulting from the clogging by desiccation of the ink, the clogging by adherence of dust, or the production of bubbles attributable to remaining gas.

So, as at the beginning of recording, ink is forcibly discharged to release the non-discharge state.

During such non-discharge recovery operation, ink is not discharged toward recording paper, but ink is discharged with the nozzle portion being covered with a cap.

There are various structures of this cap, and the structure adopted most often is one in which an ink absorbing member comprising, for example, a sponge material, is provided in the cap and ink is discharged toward and absorbed by the absorbing member.

In the cap of such a structure, if the ink absorbed by the absorbing member is not discharged by some means, the absorbing member will contain therein more ink than it can absorb and will thus become useless for the non-discharge recovery operation.

As a method of removing ink from the ink absorbing member in such a state, a system for squeezing out ink by the provision of a throttle mechanism has been widely adopted.

As such a throttle mechanism, there would come to mind a mechanism of a structure in which an ink absorbing member is contained in a frame member of substantially L-shaped cross-section and a throttle plate is disposed below the absorbing member to squeeze out ink.

However, in the mechanism of the above-described structure, all of the absorbing member, the frame member supporting it and the throttle plate are disposed horizontally, and this has sometimes led to a problem that when the absorbing member is throttled by the throttle plate, ink is forced out forwardly of the absorbing member as well and by so throttling, the head side is stained by ink.

The phenomenon that ink is forced out forwardly of the ink absorbing member occurs in the forward lower corner of the absorbing member and therefore, ink is liable to stain especially the head side.

As another example of such a throttle mechanism, a structure is also conceivable in which, for example, two upper and lower throttle plates are provided and an ink absorbing member is sandwiched between the two throttle plates so that the absorbing member is pressed from above and below to thereby squeeze out the absorbed ink.

However, the adoption of such a throttle mechanism has sometimes led to the following problem.

That is, the ink jet printer has been made compact and the nozzle itself has also been made compact and therefore, the cap has also unavoidably been made compact correspondingly thereto, and to make the throttle mechanism function effectively in the compact cap, it must be contained in a narrow space and in such a case, squeezed ink will make a bridge between it and the wall surface of the case of the cap or will remain in the cap.

If ink remains in the cap, the ink adheres to and stains recording paper or the like or the ink adheres to the nozzle side, and in some cases this has led to an inconvenience that proper discharge of ink cannot be accomplished.

Also, in a structure wherein two upper and lower throttle plates are brouhgt close to each other to squeeze out ink, the squeezing operation is effected substantially in the central portion of the narrow space in the cap, and the throttle plates are near the upper and lower side walls of the cap and therefore, a bridge is created inevitably.

Further, sponge-like formed synthetic resin is widely used for the ink absorbing member employed in such a throttle mechanism.

However, such an ink absorbing member has the property of swelling by absorbing ink.

On the other hand, the dimensional accuracy between the ink absorbing member and the head is required to be considerably high in order to positively absorb ink.

Accordingly, unless the absorbing member is mounted with its rate of swelling being accurately taken into account, the dimension thereof will become wrong.

Heretofore, however, the absorbing member has been held by being adhesively secured to the support frame side or by a complicated structure, and this has sometimes led to a problem that when the absrobing member swells, the dimensional accuracy thereof is not obtained and accurate and positive ink absorption cannot take place.

Also, there are cases where the absorbing member must be replaced with a new one after it has been used for a predetermined period of time, and in preparation for such cases, the absorbing member must be of a readily replaceable structure and must be held on the support frame side, but the absorbing member of the conventional structure has been very cumbersome to mount and dismount.

The considerably complicated flow path of an ink jet printer or the like for supplying ink is often constituted by a tube.

Through such a flow path, supply of ink is effected by the driving of a pump or a valve.

However, in the flow path system, there is a flow path in which flow of ink takes place, without pressurization, in addition to the flow path in which flow of ink is effected by the pressure of a pump or the like.

An example of it such as a drain tube which directs into a drain tank the waste ink such as the ink squeezed out from said absorbing member.

Such a drain tube can be a thin tube simply connecting the ink collecting unit to the drain tank and adapted so that ink flows therethrough from gravity.

Such a drain tube is widely used not only in ink jet printers but also in various apparatuses handling fluid.

The use of a thin tube as such a drain tube is for the purpose of facilitating piping and preventing desiccation of ink or other liquid in the flow path system.

The flow path structure in which flow of liquid is effected by the use of the thin tube as described above and in accordance with the law of gravity suffers from the following problem.

Where, the diameter of the tube constituting the flows path is small, the influence of surface tension is great, and where liquid such as ink is not flowing continuously in a great deal, for example, where liquid flow intermittently in the form of liquid droplets (individually independent small volumes of liquid, i.e., small amounts of liquid), meniscus by surface tension is produced on the upper and lower end surfaces of the small amounts of liquid in the tube and these small amounts of liquid stop in the intermediate portion of the tube.

When such a phenomenon occurs at a plurality of locations in the tube, the tube becomes closed up by these small amounts of liquid to block the passage of the succeeding liquid, and this has sometimes led to occurrence of overflow or the like.

One means for eliminating such an inconvenience is to increase the diameter of the tube, whereas an increased diameter of the tube not only makes piping difficult, but also increases the amount of flow of air, which has sometimes led to desiccation of the liquid.

SUMMARY OF THE INVENTION

The present invention has been made in view of the above-noted problems and an object thereof is to provide a capping device and an ink jet recording apparatus in which ink absorbed by an absorbing member can be positively squeezed.

Another object of the present invention is to provide a capping deivce and an ink jet recording apparatus in which a head and/or recording paper is not stained by ink absorbed by an absorbing member.

Still another object of the present invention is to provide a capping device and an ink jet recording apparatus in which an absorbing member before swelling can be accurately mounted with the rate of swelling of the absorbing member taken into account and the dimensional accuracy when the absorbing member has become swollen can be maintained accurately.

Yet still another object of the present invention is to provide an ink jet recording apparatus having a flow path structure which can prevent flow of air by liquid remaining in a flow path and thereby prevent desiccation of liquid which, when a great amount of liquid has been directed to the flow path side, the liquid remaining in the flow path can be expelled by the head pressure thereof to thereby effect flow of liquid.

A further object of the present invention is to provide a capping device provided with a support frame of substantially L-shaped cross-section contained in a frame and supporting an ink absorbing member inside thereof, and a throttle plate in contact with the underside of said absorbing member and disposed substantially parallel to said support frame, said capping device being so disposed that the rear end edge of said throttle plate opposite to a recording head is situated vertically below the side edge surface of the recording head.

Still a further object of the present invention is to provide a capping device having a support frame of substantially L-shaped cross-section contained in a frame, an upwardly and downwardly movable throttle plate provided under and inside said support frame, and an ink absorbing member disposed between said support frame and said throttle plate, characterized in that a ridge is provided on the underside of the upper plate of said support frame over the full length of said support frame, said ridge being adapted to stick in the upper side of said absorbing member when said absorbing member swells.

Yet still a further object of the present invention is to provide a capping device characterized by the provision of a support frame of substantially L-shaped cross-section contained in a frame and supporting an ink absorbing member inside thereof, a throttle plate disposed in contact with the underside of said ink absorbing member, a bent arm member having one end pivotally supported on said throttle plate and the other end pivotally supported on one end of the arm of a shaft disposed parallel to said support frame, an arm member having one end fixed to said support frame and the other end pivotally supported coaxially with the arm member which is adjacent to said throttle plate, a stopper provided at a position which is in contact with the bent portion of the arm member which is adjacent to said throttle plate, and drive means for rotating said shaft in forward and reverse directions.

Another object of the present invention is to provide an ink jet recording apparatus comprising a head element for discharging ink and effecting recording, a recording flow path communicating said head element with one end of a first ink tank, a pump side flow path communicating said first ink tank with said head element through a pump and constituting an ink circulation path with said recording flow path through said head element and said first ink tank, a second ink tank for supplying ink to said first ink tank, and a capping device provided for movement to a position in which it covers the front face of said head element and a position separate from said head element and having therein an ink absorbing member urged against said head element, said capping device being provided with a support frame of substantially L-shaped cross-section supporting said absorbing member inside thereof, and a throttle plate in contact with the underside of said absorbing member and disposed substantially parallel to said support frame, said capping device being so disposed that the rear end edge of said throttle plate opposite to a recording head is situated vertically below the side edge surface of the recording head.

Still another object of the present invention is to provide a flow path structure characterized in that a flow path for directing liquid from above to below is divided into at least two upper and lower stages, said upper stage being of such a degree of large diameter that meniscus of liquid droplets does not occur, and said lower stage being of such a degree of small diameter that permits occurrence of meniscus of liquid droplets.

DESCRIPTION OF THE PREFERRED EMBODIMENT

Figure 1:
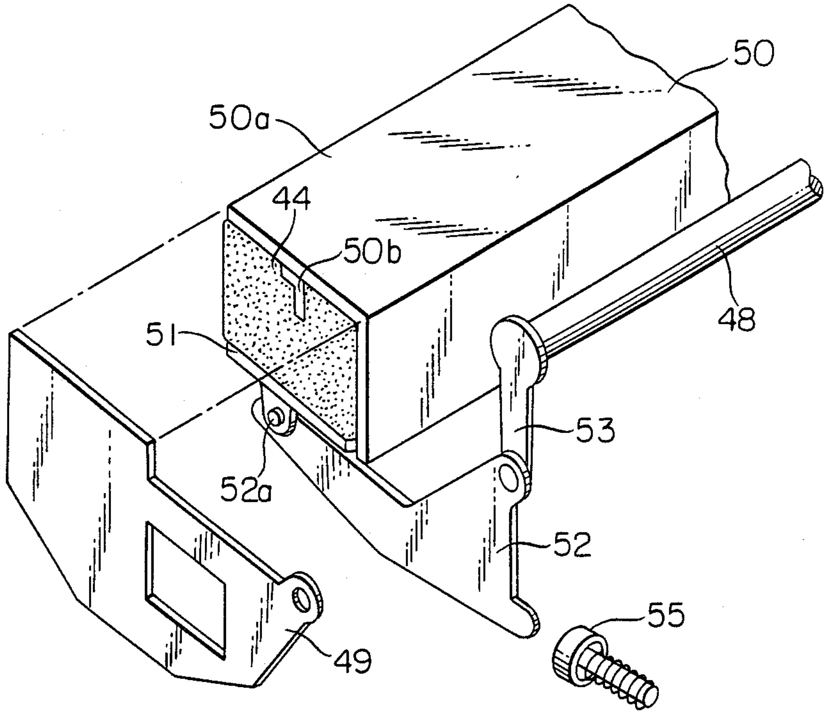
FIG. 1 is a schematic perspective view for illustrating the essential portions of a cap device.

The present invention will hereinafter be described in detail with respect to an embodiment thereof shown in the drawings.

Figure 2:
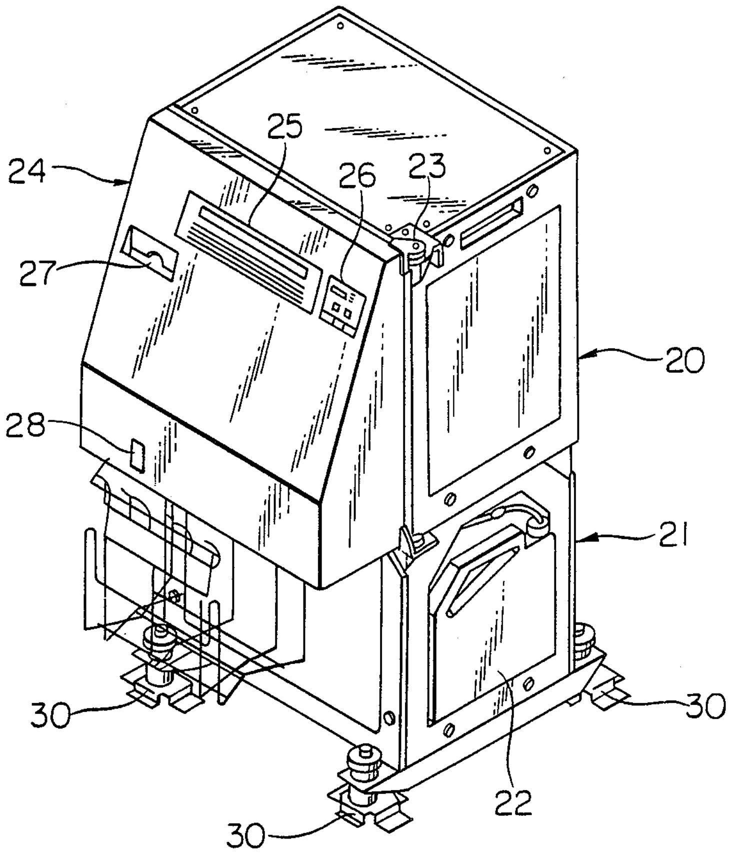
FIG. 2 is a schematic pictorial perspective view for illustrating a printer.
Figure 3:
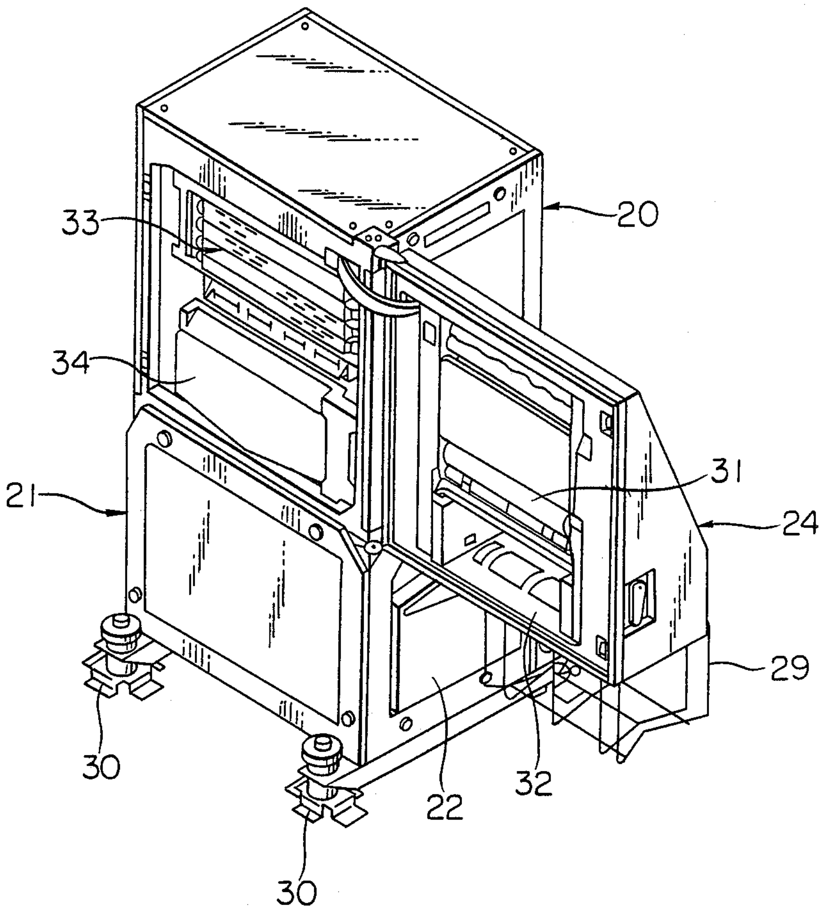
FIG. 3 is a schematic perspective view of the printer with a paper supply unit opened.

FIG. 1 and so on illustrate an embodiment of the present invention, and the whole of a color ink jet printer to which the present invention is applied is shown in the schematic perspective views of FIG. 2 and 3.

The embodiment illustrated adopts the bubble jet system and is shown as an on-demand type printer.

Designated by 20 in FIGS. 2 and 3 is an upper unit in which a head unit is contained as will be described later.

Below the upper unit 20, there is a lower unit in which a power source portion is contained.

Outside the lower unit 21, a removable drain tank 22 is mounted in such a manner as to be visible from outside.

On this side of the upper unit 20, a paper supply unit 24 is openably and closably mounted by means of a hinge 23.

A flap 25 is removably mounted on the upper portion of the front side of the paper supply unit 24.

This flap 25 is a lid covering a paper discharge port and is removed by the operator during the actual printing.

An operating panel 25 is provided adjacent to the flap 25.

Designated by 27 is a pocket in which a manual or the like is contained.

In the lower portion of the fornt side of the paper supply unit 24, there is formed an opening 28 through which the amount of remaining recording paper may be examined.

In the lower portion of the paper supply unit 24, there is provided a stacker formed by bending a steel wire or the like.

Base units 30 are attached to the lower end of the lower unit 21.

A paper supply mechanism 31 is provided inside the paper supply unit 24, and below it, there is provided a recording paper containing space.

Also, the upper unit 20 provides a member for containing the head unit therein, and a bubble jet assembly (hereinafter referred to as BJA) 33 is removably mounted on the upper portion thereof.

On this side of the BJA 33, a cap 34 is mounted for upward and downward movement.

Figure 4:
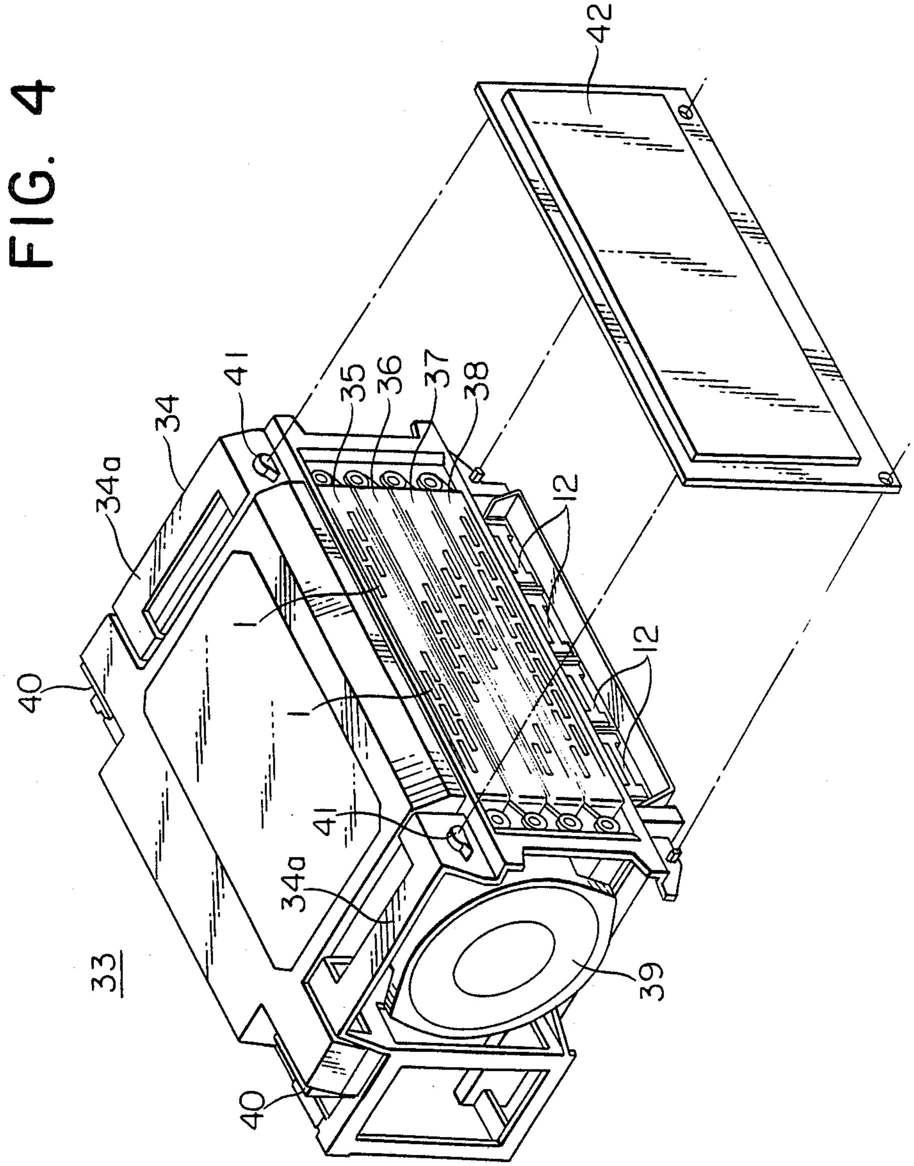
FIG. 4 is a schematic perspective view of BJA.

That is, the BJA 33 is assembled with a FIG. 4

That is, the BJA 33 is assembled with a firm frame 34 as a standard and is removably mounted in the upper space of the upper unit 20.

Four bubble jet units (hereinafter referred to as BJUs) 35–38 are removably mounted on the front face of the frame 34.

In the case of the present embodiment, these BJUs 35–38 are arranged in the order of black, cyan, magenta and yellow from the top.

Each of the BJUs 35–38 has a plurality of head elements 1, each of which has a number of, say, 128 nozzles (not shown).

The head elements 1 are arranged in a staggered fashion in two stages in each BJU 35–38, while the nozzles are arranged so as not to vertically overlap one another.

Below the BJUs 35–38, second ink tanks 12 filled with inks corresponding to the respective colors are removably mounted.

These second ink tanks 12 are connected to first ink tanks 7 provided on the back side of the BJA 33, although not shown in FIG. 4.

Such connection is automatically accomplished simply by mounting the second ink tanks 12.

A fan 39 for supplying cooling air is mounted on each of the opposite ends of the frame 34 of the BJA 33.

The BJA 33 of such a structure may be removably mounted in the upper unit 20 by grasping the right and left handles 34*a* of the frame 34 and, when thus mounted, the BJA 33 is automatically connected to the terminal of the power source of the upper unit 20 side through connectors 40 provided on the rear end of the frame 34.

Designated by 41 are knobs for locking and unlocking the connectors 40.

On the other hand, denoted by 42 in FIG. 4 is a cap cover which is mounted to cover the BJUs 35–38.

It is when the BJA 33 is to be mounted or dismounted that this cap cover 42 is mounted.

That is, the cap cover 42 is mounted by all means when the BJA 33 is handled, because the diameter of the nozzles formed in the head elements 1 is so small that the nozzles may be closed if they are simply touched by the finger tips.

Figure 5:
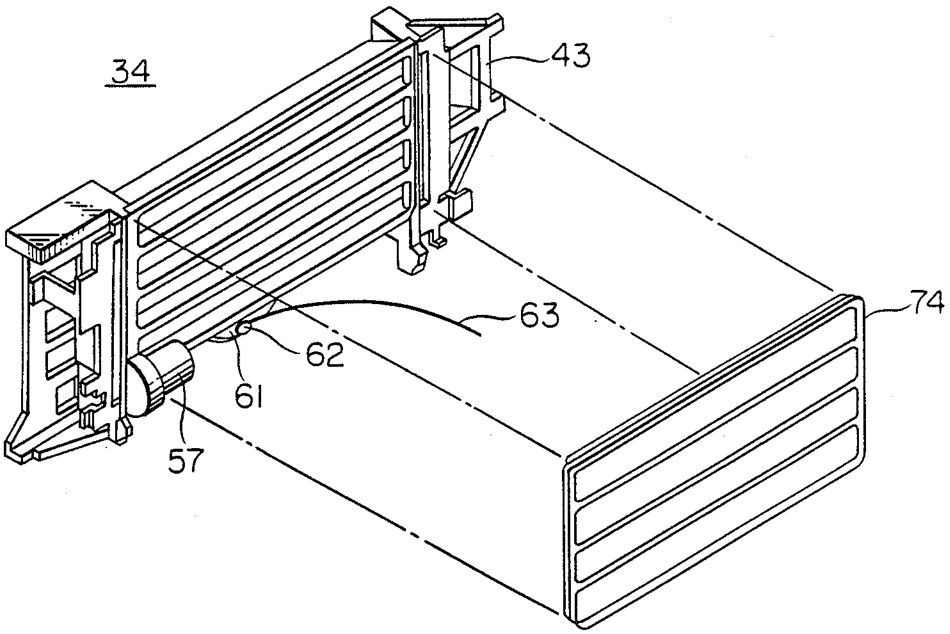
FIG. 5 is a schematic perspective view of a cap.
Figure 6:
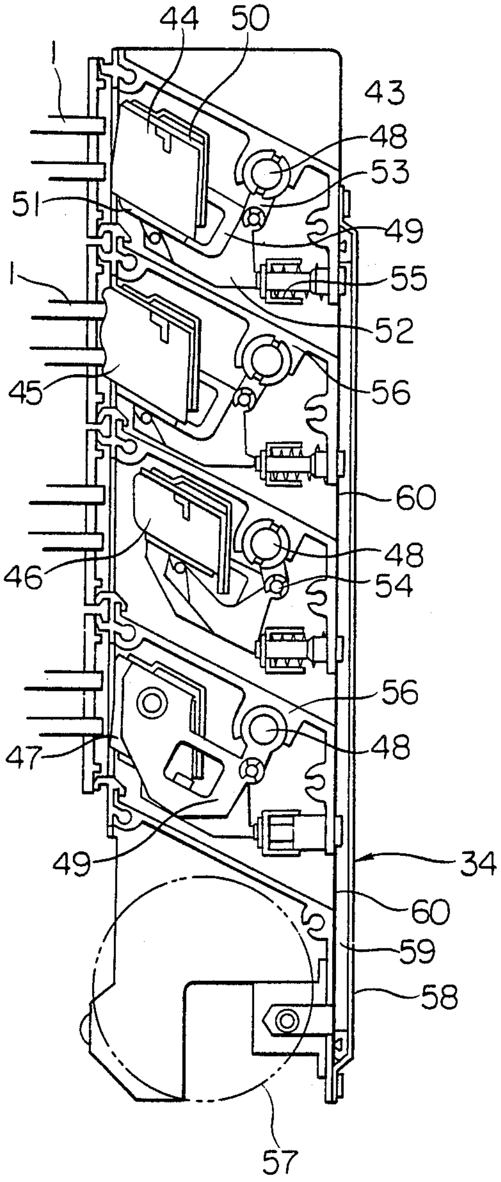
FIG. 6 is a schematic longitudinal cross-sectional view of the cap.

Now, the upwardly and downwardly movable cap 34 is constructed as shown in FIGS. 5 and 6.

That is, the cap 34 is assembled with a firm frame 43 as a standard and is provided for upward and downward movement by a driving device, not shown, and is movable to a position in which it covers the BJA 33 and a position in which it is completely downwardly separate from the BJA 33 as shown in FIG. 3.

Ink absorbing members 44–47 covering the respective head elements 1 of the BJUs 35–38 are contained in the cap 34.

The ink absorbing members 44–47 are contained in support frames 50 fixed to arms 49 pivotally supported on the frame 43 by means of a shaft 48, and a throttle plate 51 is disposed below each ink absorbing member 44–47 and is pivotally supported on the end of another arm 52 by means of a pin 52*a*.

That is, the arms 49 and 52 are pivotally supported on the end of an arm 53 extending downwardly from the shaft 48, by means of a shaft 54.

The arms 49 and 52 are pivotally provided along the lengthwise direction of the support frame 50.

A stopper 55 is provided on the frame 43 side at a position opposed to the bent portion of the arm 52 supporting the throttle plate 51.

On the other hand, as is apparent from the drawings, the cross-section of the absorbing members 44–47 is substantially lozenge-shaped and the front and rear surfaces thereof are parallel to the front side of the head elements 1.

The absorbing members are inclined so that the upper and lower surfaces thereof become lower away from the head side, and the upper and lower surfaces are parallel to each other.

Chamfered portions 44a–47a are formed at a lower corner of the front face of the respective absorbing members 44–47.

Accordingly, the lower corner of the front face of each absorbing member is away from the head side.

Also, the upper surface of each support frame 50 and each throttle plate 51 are parallel to the upper and lower surfaces of the absorbing member and become lower away from the head side.

A gap 50c is formed between the rear end of each throttle plate 51 and the lower end of the side wall of each support frame 50.

On the other hand, a ridge 50b is provided downwardly projectedly on the lower surface of the upper plate 50a of each support frame 50.

This ridge 50b, in the case of the shown example, is of a structure in which a metal plate or the like of substantially L-shaped cross-section is fixed as by spot welding. Of course, the ridge 50b may be formed integrally with the upper plate 50a.

The ridge 50b is provided on the lower surface of the upper plate 50a over the full length thereof.

Figure 8A:
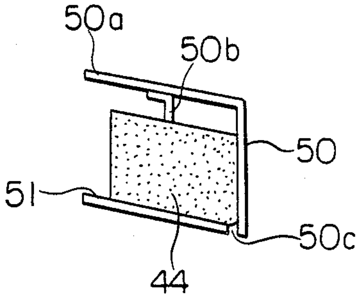
FIGS. 8A and 8B are schematic cross-sectional views for illustrating the mounting and swelling, respectively, of an absorbing member.
Figure 8B:
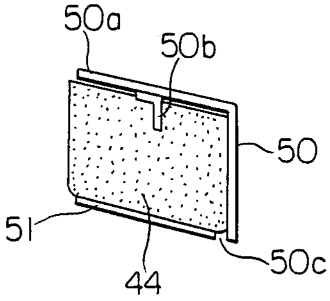

The mounting of the ink absorbing members 44–47 in the case where such ridges 50b are provided is done in the manner as shown in FIGS. 8A and 8B.

That is, absorbing members 44–47 not containing moisture such as ink and relatively hard and not swollen are first prepared.

At this time, the size of the absorbing members is determined with the pre-known rate of swelling thereof being taken into account.

Accordingly, with the absorbing member being first fitted between the support frame 50 and the throttle plate 51, the upper end of the absorbing member is retracted inwardly from the end edge of the upper plate 50a as shown in FIG. 8A and the ridge 50b is slightly in contact with the upper surface of the absorbing member.

If ink swells in this state, the absorbing member 44–47 becomes swollen as shown in FIG. 8B and the ridge 50b sticks in the absorbing member 44–47.

In such swollen state, the front face of the absorbing member can protrude from the end edge of the upper plate 50a of the support frame 50 so as to be able to contact the head side.

The then amount of protrusion is accurately dimension-controlled because the rate of swelling is known.

In its swollen state, the absorbing member is only restrained by the ridge 50b and the throttling work and the ink absorbing work can be freely carried out.

Also, removal of the absorbing members during the replacement thereof is very easy.

Now, the ink absorbing members 44–47, the support frames 50, the throttle plates 51, and the arms 49, 52 are contained in elongated spaces partitioned by parallel partition plates 56 provided across and inclined with respect to the frame 43.

The partition plates 56 are disposed so that the absorbing member side (the head side) thereof is high and the opposite side thereof is low.

A motor 57 which provides a drive source for the throttle mechanism is disposed in the lower portion of the frame 43.

On the other hand, a cover 58 is fixed to this side of the frame 43, i.e., that side of the frame 43 which is opposite to the ink absorbing members 44–47.

This cover 58 is formed into the shape of a shallow disk, and a space 59 which provides an ink path is formed between the cover 58 and the side surface of the frame 43.

The space 59 is in communication with the spaces between the partition plates 56 in which the absorbing members and the throttle mechanism are contained, through openings 60.

An inverted trapezoidal protrusion 61 is projectedly provided centrally of the lower portion of the frame 43.

This protrusion 61 is formed into a hollow and is in communication with said space 59.

The protrusion 61 is connected to a tube 63 through a joint 62, and the tube 63 in turn is connected to said drain tank 22.

Accordingly, the throttled ink is directed from the inclined partition plates 56 into the space 59 through the openings 60 and further into the space of the protrusion 61 which is situated at the lowermost end, and then into the drain tank 22 through the tube 63.

Figure 7:
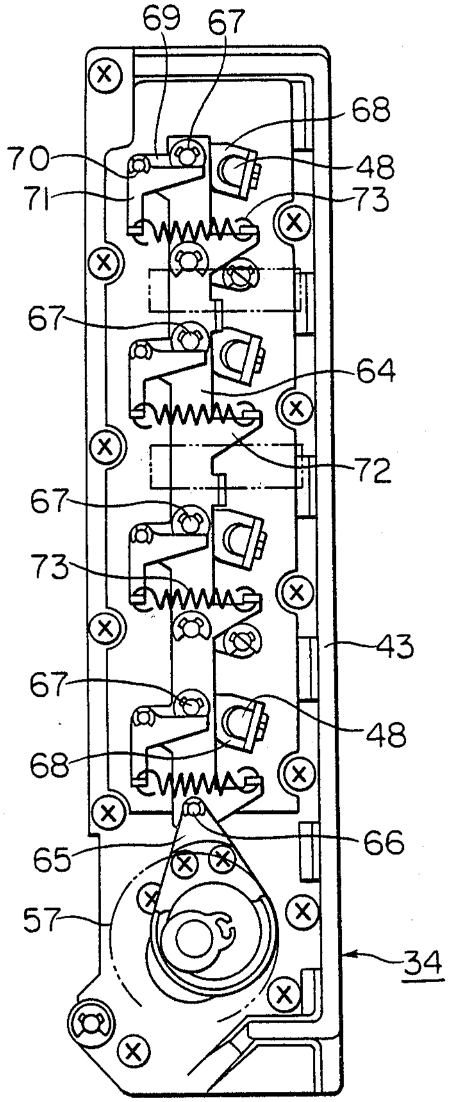
FIG. 7 is a schematic side view of the cap.

Now, as shown in FIG. 7, a lever 64 is disposed vertically on that side edge of the frame 43 on which the motor 57 is mounted.

The lower end of this lever 64 is pivotally supported on the upper end of a pivotable lever 65 which is fixed to the output shaft side of the motor 57, by means of a pin 66.

One end of arms 68 is pivotally supported on the vertically disposed lever 64 by means of pins 67 at the same pitch as the arrangement pitch of the absorbing members 44–47, and the other ends of the arms 68 are fixed to said shaft 48.

Also, projected pieces 69 are provided on that side edge of the lever 64 which is opposite to the arms 68, and bent portions of substantially L-shaped levers 71 are pivotally supported on these projected pieces 69 by means of pins 70.

One end of each of these levers 71 is in contact with the lower side of said pin 67, and a spring 73 is extended between the other end of each of the levers 71 and a projected piece 72 provided below and on the opposite side of each projected piece 69.

Accordingly, the levers 71 are biased for counterclockwise rotation as viewed in FIG. 7 and the lever 64 is normally biased upwardly.

Designated by 74 in FIG. 5 is a cap cover used during the preservation or the like.

Operation of the present embodiment constructed as described above will now be described.

During the use of the printer, the paper supply unit 24 is closed and the cap 34 is moved downwardly.

Accordingly, the BJA 33 is in facing relationship with recording paper.

In this state, the head elements 1 are operated in accordance with a recording instruction and color recording is effected by the use of inks of respective colors.

On the other hand, when the nozzles become clogged, the ink non-discharge recovery operation is performed, and at this time, the operator operates a button or the like for non-discharge recovery operation provided on the panel 26.

At this time, the cap 34 is moved upwardly and covers the front face of the BJA 33.

At this time, the respective ink absorbing members 44–47 are opposed to the head elements 1, as shown in FIG. 6.

FIG. 6 shows the four ink absorbing members 44–47 in the operation sequence in accordance with the lapse of time from above, and is shown as a cross-sectional view for illustrating the operation.

Before the non-discharge recovery operation is started, the motor 57 is stopped and the pivotable lever 65 is in its substantially vertical position, and the levers 71 are rotated counter-clockwise by the force of the springs 73 and the lever 64 is in its upper limit position by means of the pins 67.

As a result, the arms 68 are in their clockwise rotational limit position and the shafts 48 are also in their clockwise rotational limit position, and the arm 53 is also in its clockwise rotational limit position, as shown in the first stage of FIG. 6

At this time, the ink absorbing member 44 is not in contact with the head elements 1.

When the motor 57 is operated in this state, the pivotable lever 65 begins to be pivotally moved and as a result, the lever 64 is pulled downwardly.

Accordingly, the arms 68 begin to be rotated counterclockwise and the shafts 48 and arms 53 also begin to be rotated in the same direction.

As a result, the ink absorbing members move counterclockwise while depicting an arcuate locus with the support frames 50 and the throttle plate 51, and the absorbing member designated by 45 in FIG. 6 comes into contact with the head elements 1.

In this state, discharge of ink is effected and the discharged ink is absorbed into the absorbing member 45.

During the above-described operation, the arms 52 adjacent to the throttle plates 51 flex the springs of the stoppers 55.

When the lever 64 is further moved downwardly, the shafts 48 and arms 53 are further rotated clockwise.

At this time, the bent portion of the arm 52 is in contact with the stopper 55 as indicated in the portion of the absorbing member designated by 46 in FIG. 6 and therefore, the arm 52 is forcibly rotated clockwise with this portion of contact as the fulcrum.

As a result, the arm 49 is pushed up and the support frame 50 rotates clockwise while depicting an arcuate locus with the absorbing member 46 and is thus moved upwardly.

Then the absorbing member 46 separates from the head elements 1 while, at the same time, the throttle plate 51 is moved up and the absorbed ink is squeezed.

The squeezed ink falls from the gap 50*c* between the throttle plate 51 and the support frame 50 onto the partition plate 56 and is directed along the inclined surface toward the space 59, and collects on the protrusion 61 and is directed into the drain tank 22 through tube 63.

This squeezing operation is effected in the upper portion of the narrow space between the partition plates 56 and 56 and therefore, the squeezed ink does not make a bridge between the partition plates 56 which form the bottom plates, but the squeezed ink falls positively and is directed toward the drain tank and thus, adherence or remaining of the ink does not occur.

Now, during the above-described squeezing operation, the ink oozes in the lower corner of the front face of each absorbing member, but if a chamfered portion is formed in this portion, the ink will not adhere to and stain the head even if it oozes.

The oozing ink falls onto the partition plates 56 from gravity.

When the squeezing operation is terminated in this manner, the motor 57 revolves in the reverse direction and the lever 64 is moved upwardly.

Therefore, the arms 68 are rotated clockwise and the shafts 48 and arms 53 are also rotated clockwise and thus, the arms 49 and 52 restore their original positions and, as shown in the lowermost stage of FIG. 6, the ink absorbing member restores its original position.

In this manner, one cycle of squeezing operation is effected and the entire cap 34 is moved downwardly and separates from the BJA 33, thus assuming its standby position.

The ink absorbed into the absorbing member in this manner is positively throttled and does not adhere to the cap and thus, does not stain the head nor remain on the head side to stain the recording paper.

In the above-described embodiment, a number of ink absorbing members and throttling mechanisms corresponding to the number of colors of inks are provided because the apparatus is a color printer, but only a set of ink absorbing member and throttling mechanism may be provided where the ink may be of one color.

Also, the ridge provided on the underside of the upper plate 50*a* of each support frame has been shown as being projected vertically downwardly, whereas the direction of projection may be any direction in which the absorbing member can be hooked, and the ridge need not always be provided on a streight line, but may be bent.

Also, depending on the material of the absorbing members, the ridge may be provided on the throttle plate 51 side.

As is apparent from the foregoing description, according to the present invention, a structure is adopted in which the ink absorbing members are substantially lozenge-shaped and the front and rear surfaces of the absorbing members are parallel to the head side and the upper and lower surfaces of the absorbing members are parallel to each other and become lower away from the head side and the upper surface of the support frames and the throttle plates are along the upper and lower surfaces of the absorbing members and a gap is provided between the rear end of each throttle plate and the lower end of the side wall of each support frame and therefore, the absorbed ink falls naturally from the gap between each throttle plate and each support frame and even during the squeezing operation, the ink is throttled out of this gap and the amount of ink forced out toward the head is small.

Also, a chamfered portion is formed at the lower corner of the front face of each absorbing member and therefore, even if ink is forced out into the lower corner of the front face during squeezing, ink will not adhere to and stain the head because said lower corner is far away from the head side.

Further, according to the present invention, a structure is adopted in which a ridge is provided on the underside of the upper plate of each support frame and the swollen state of the ink absorbing members is maintained by this ridge and therefore, the absorbing members before they are swollen can be accurately mounted with the rate of swelling of the absorbing members taken into account, and the dimensional accuracy when the absorbing members become swollen can also be accurately maintained.

Also, even when the absorbing members become swollen, the ridges only stick in the absorbing members and cannot restrain the absorbing members and therefore, the squeezing operation and the absorbing operation can be effected freely and the removal of the absorbing members is also easy and even the swollen state, the dimensional accuracy can be maintained very high.

In addition, according to the present invention, a structure is adopted in which arms supporting the support frames of the ink absorbing members and arms supporting the throttle plates disposed below the absorbing members are pivotally supported on the shafts rotated by the lever moved up and down by the motor, through projected arms, and the arms supporting the throttle plates have the pivotal movement of their bent portions controlled by a stopper and therefore, by the pivotal movement of the absorbing members which accompanies the pivotal movement of each arm, the absorbing operation by the contact of the absorbing members with the head and the squeezing operation in the portion separate from the head and above the space of the cap can be effected as a series of operations.

Accordingly, during the squeezing operation, the distance between the absorbing members and the bottom of the cap is maximum and therefore, no bridge of ink is formed and the squeezed ink is reliably collected into the drain tank and thus, does not stain the head side and accordingly the recording paper.

The flow path structure of the present invention will now be described with reference to the schematic illustrations of the flow path structures of the present invention shown in FIGS. 9 and 10.

Figure 9:
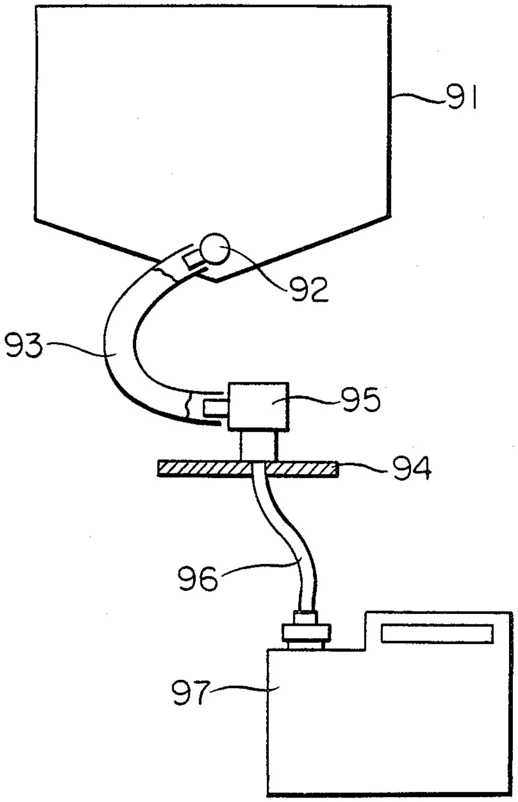
FIGS. 9 and 10 are schematic illustrations for illustrating flow path structures.

Referring to FIG. 9 which illustrates a preferred embodiment of the flow path structure of the present invention, reference numeral 91 designates a storage tank in which liquid such as ink is temporarily stored. One end of a tube 93 of large diameter is connected to the lowermost portion of the storage tank 91 through a joint 92.

The other end of the tube 93 of large diameter is connected to the upper end of a tube 96 of small diameter through an intermediate joint 95 fixed to the partition plate 94 of the apparatus.

The lower end of the tube 96 of small diameter is connected to a drain tank 97.

If the structure as described above is adopted, the flow path is divided into two upper and lower stages, and the upper stage is provided by the tube of large diameter and the lower stage is provided by the tube of small diameter and therefore, the following phenomenon occurs.

That is, if the diameter of the tube 93 of large diameter is selected to such a degree of diameter that meniscus of liquid droplets does not occur, for example, a diameter of 8 mm or more, no meniscus will occur in the droplets which pass through this portion, and a small amount of liquid which will close the path will not remain but will flow toward the tube 96 small diameter.

On the other hand, meniscus of liquid will occur in the tube 96 of small diameter and a small amount of liquid will remain therein.

By such remaining of the liquid, the flow of air between the storage tank 91 and the drain tank 97 has been blocked and thus, desiccation of the liquid in the flow path has not occurred.

On the other hand, when the amount of liquid flowing to the tube 93 large diameter becomes great, the head pressure thereof is applied to the small amount of liquid remaining in the tube 96 of small diameter and thus, the small amount of liquid can no longer remain and has been collected into the drain tank 97 with the great amount of liquid.

If the structure as described above is adopted, occurrence of overflow can be prevented simply by providing the tube 93 of large diameter over a slight length and desiccation of the liquid can be prevented by the liquid droplets remaining in the tube 96 of small diameter.

Also, the tube 93 of large diameter may be provided only over a slight distance and therefore, piping is not difficult and does not occupy so large a space.

Figure 10:
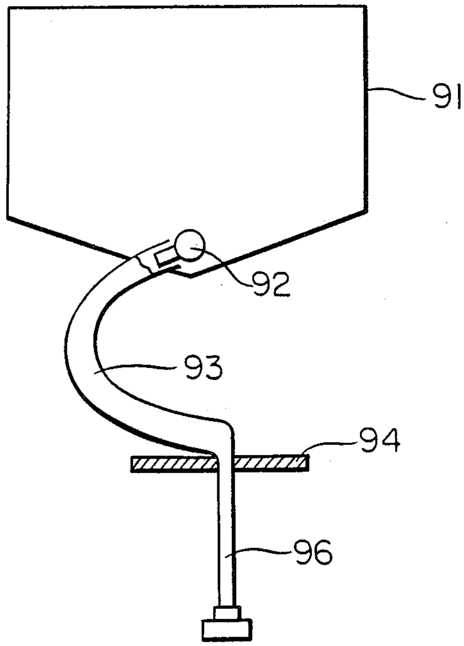

In FIG. 10 which illustrates another embodiment of the flow path structure of the present invention, portions identical to those in FIG. 9 are given identical reference numerals and need not be described.

In the present embodiment, the tube 93 of large diameter and the tube 96 of small diameter are not connected together through the intermediate joint 95, but they are formed integrally with each other.

Adoption of such a structure has resulted in obtainment of an effect similar to that of the above-described embodiment.

In the above-described embodiments, the tube constituting the flow path is divided into two upper and lower stages, and the upper stage is provided by a tube of large diameter and the lower stage is provided by a tube of small diameter, but alternatively, tubes of large diameter and small diameter, respectively, may be provided in a plurality of stages from above.

Further, in the above-described embodiments, the flow path has been shown as being provided by tubes, but of course, the flow path may be formed integrally with the wall surface or the like.

As is apparent from the foregoing description, the flow path structure of the present invention adopts a structure in which the flow path for directing liquid by the utilization of gravity is divided into at least two upper and lower stages and the upper stage is of such a degree of large diameter that meniscus of liquid droplets does not occur and the lower stage is of such a degree of small diameter that permits occurrence of meniscus of liquid droplets and therefore, by the liquid droplets remaining in the flow path of small diameter, flow of air can be prevented to thereby prevent desiccation of liquid, and when a great amount of liquid is directed to the flow path of large diameter, the liquid droplets remaining in the flow path of small diameter can be expelled by the head pressure thereof to thereby effect flow of liquid.

Also, the flow path has a portion of large diameter only in a portion thereof and therefore, piping is very easy.

We claim:

1. A capping device provided with a support frame of substantially L-shaped cross-section contained in a frame and supporting an ink absorbing member inside thereof, and a throttle plate in contact with the underside of said absorbing member and disposed substantially parallel to said support frame, said capping device being so disposed that the rear end edge of said throttle plate opposite to a recording head is situated vertically below the side edge surface of the recording head.

2. A capping device according to claim 1, wherein a gap is provided between said support frame and said rear end edge of said throttle plate and the lower end of the side plate of said support frame.

3. A capping device according to claim 1, wherein the cross-sectional shape of said absorbing member is substantially a parallelogram.

4. A capping device according to claim 1, wherein said support frame is provided with a ridge adapted to stick in said absorbing member when said absoring member swells.

5. A capping device according to claim 4, wherein said ridge is provided over the full length of said support frame.

6. A capping device according to claim 1, wherein said throttle plate is provided with a ridge adapted to stick in said absorbing member when said absorbing member swells.

7. A capping device according to claim 6, wherein said ridge is provided over the full length of said throttle plate.

8. A capping device according to claim 3, wherein the surface of said absorbing member which is adjacent to said recording head is disposed parallel to said recording head.

9. A capping device according to claim 1, further provided with a bent arm member having one end pivotally supported on said throttle plate and the other end pivotally supported on one end of the arm of a shaft disposed parallel to said support frame, said arm member having one end fixed to said support frame and the other end pivotally supported coaxially with said arm member which is adjacent to said throttle plate, a stopper provided at a position which is in contact with the bent portion of the arm member which is adjacent to said throttle plate, and drive means for rotating said shaft in forward and reverse directions.

10. A capping device according to claim 1, wherein a flow path structure for directing ink squeezed out from said absorbing member is provided by dividing a flow path for directing liquid from above to below into at least two upper and lower stages, said upper stage being of such a degree of large diameter that meniscus of the liquid does not occur, and said lower stage being of such a degree of small diameter that permits occurrence of meniscus of the liquid.

11. A capping device according to claim 10, wherein the diameter of the flow path in said portion of large diameter is 8 mm or more.

12. An ink jet recording apparatus having a capping device provided with a support frame of substantially L-shaped cross-section contained in a frame and supporting an ink aborbing member inside thereof, and a throttle plate in contact with the underside of side absorbing member and disposed substantially parallel to said support frame, said capping device being so disposed that the rear end edge of said throttle plate opposite to a recording head is situated vertically below the side edge surface of the recording head.

13. A capping device having a support frame of substantially L-shaped cross-section contained in a frame, an upwardly and downwardly movable throttle plate provided under and inside said support frame, and an ink absorbing member disposed between said support frame and said throttle plate, characterized in that a ridge is provided on the underside of the upper plate of said support frame over the full length of said support frame, said ridge being adapted to stick in the upper side of said absorbing member when said absorbing member swells.

14. A capping device characterized by the provision of a support frame of substantially L-shaped cross-section contained in a frame and supporting an ink absorbing member inside thereof, a throttle plate disposed in contact with the underside of said ink absorbing member, a bent arm member having one end pivotally supported on said throttle plate and the other end pivotally supported on one end of the arm of a shaft disposed parallel to said support frame, an arm member having one end fixed to said support frame and the other end pivotally supported coaxially with the arm member which is adjacent to said throttle plate, a stopper provided at a position which is in contact with the bent portion of the arm member which is adjacent to said throttle plate, and drive means for rotating said shaft in forward and reverse directions.

* * * * *

UNITED STATES PATENT AND TRADEMARK OFFICE
CERTIFICATE OF CORRECTION

PATENT NO. : 4,748,459

DATED : May 31, 1988

INVENTOR(S) : HIROO ICHIHASHI, ET AL.

It is certified that error appears in the above-identified patent and that said Letters Patent is hereby corrected as shown below:

AT [57] IN THE ABSTRACT

Line 10, "The specification also discloses an ink" should be deleted.
Line 11, "jet recording apparatus having such capping device." should be deleted.

COLUMN 2

Line 17, "brouhgt" should read --brought--.
Line 39, "absrobing" should read --absorbing--.
Line 57, "place," should read --place--.
Line 60, "it such as" should read --such is--.

COLUMN 3

Line 8, "Where," should read --Where--.
Line 9, "flows" should read --flow--.
Line 11, "flow" should read --flows--.

COLUMN 5

Line 38, "fornt" should read --front--.
Line 56, "That is, the BJA 33 is assembled with a FIG. 4" should read --The BJA 33 is of a structure as shown in FIG. 4.--.

COLUMN 10

Line 23, "streight" should read --straight--.
Line 67, "even the" should read --even in the--.

UNITED STATES PATENT AND TRADEMARK OFFICE

CERTIFICATE OF CORRECTION

PATENT NO. : 4,748,459

DATED : May 31, 1988

INVENTOR(S) : HIROO ICHIHASHI, ET AL.

It is certified that error appears in the above-identified patent and that said Letters Patent is hereby corrected as shown below:

COLUMN 11

Line 60, "large" should read --of large--.

COLUMN 12

Line 67, "absoring" should read --absorbing--.

COLUMN 14

Line 4, "aborbing" should read --absorbing--.

Signed and Sealed this

Twenty-eighth Day of March, 1989

*Attest:*

DONALD J. QUIGG

*Attesting Officer*

*Commissioner of Patents and Trademarks*